United States Patent
Richardson et al.

(10) Patent No.: US 10,719,173 B2
(45) Date of Patent: Jul. 21, 2020

(54) TRANSCRIBING AUGMENTED REALITY KEYBOARD INPUT BASED ON HAND POSES FOR IMPROVED TYPING ACCURACY

(71) Applicant: Oculus VR, LLC, Menlo Park, CA (US)

(72) Inventors: Mark A Richardson, Seattle, WA (US); Robert Y Wang, Kirkland, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 168 days.

(21) Appl. No.: 15/945,719

(22) Filed: Apr. 4, 2018

(65) Prior Publication Data
US 2019/0310688 A1    Oct. 10, 2019

(51) Int. Cl.
| | |
|---|---|
| *G06F 3/042* | (2006.01) |
| *G06T 19/00* | (2011.01) |
| *G06F 3/01* | (2006.01) |
| *G06F 3/0481* | (2013.01) |
| *G06K 9/00* | (2006.01) |
| *G06F 3/023* | (2006.01) |
| *G06F 1/16* | (2006.01) |

(52) U.S. Cl.
CPC ........... *G06F 3/0426* (2013.01); *G06F 1/163* (2013.01); *G06F 3/012* (2013.01); *G06F 3/013* (2013.01); *G06F 3/017* (2013.01); *G06F 3/0233* (2013.01); *G06F 3/04815* (2013.01); *G06K 9/00355* (2013.01); *G06T 19/006* (2013.01); *G06F 1/1673* (2013.01)

(58) Field of Classification Search
CPC ........ G06F 3/0237; G06F 3/011; G06F 3/017; G06F 3/0233; G06F 3/005; G06F 3/0426; G06F 3/013; G06F 3/04815; G06F 3/012; G06T 19/006; G06K 9/00355; G06K 9/00335
See application file for complete search history.

(56) References Cited

U.S. PATENT DOCUMENTS

| | | | |
|---|---|---|---|
| 5,767,842 A * | 6/1998 | Korth | G06F 3/011 345/168 |
| 6,512,838 B1 * | 1/2003 | Rafii | G01C 3/08 348/E3.018 |
| 6,614,422 B1 * | 9/2003 | Rafii | G06F 1/1626 345/156 |

(Continued)

*Primary Examiner* — Nicholas Ulrich
(74) *Attorney, Agent, or Firm* — Artegis Law Group, LLP

(57) ABSTRACT

A transcription engine transcribes input received from an augmented reality keyboard based on a sequence of hand poses performed by a user when typing. A hand pose generator analyzes video of the user typing to generate the sequence of hand poses. The transcription engine implements a set of transcription models to generate a series of keystrokes based on the sequence of hand poses. Each keystroke in the series may correspond to one or more hand poses in the sequence of hand poses. The transcription engine monitors the behavior of the user and selects between transcription models depending on the attention level of the user. The transcription engine may select a first transcription model when the user types in a focused manner and then select a second transcription model when the user types in a less focused, conversational manner.

17 Claims, 7 Drawing Sheets

(56) References Cited

U.S. PATENT DOCUMENTS

| | | | |
|---|---|---|---|
| 7,042,442 B1* | 5/2006 | Kanevsky | G06F 3/017 345/157 |
| 9,122,316 B2* | 9/2015 | Li | G06F 3/038 |
| 9,547,438 B2* | 1/2017 | Bromer | G06F 3/044 |
| 9,678,664 B2* | 6/2017 | Zhai | G06F 3/0219 |
| 9,857,971 B2* | 1/2018 | Chang | G06F 3/0426 |
| 9,898,809 B2* | 2/2018 | Xie | H04N 5/2257 |
| 10,209,881 B2* | 2/2019 | Cherradi El Fadili | G06F 3/041 |
| 2010/0231522 A1* | 9/2010 | Li | G06F 3/0423 345/169 |
| 2011/0129124 A1* | 6/2011 | Givon | G06F 3/011 382/107 |
| 2013/0265218 A1* | 10/2013 | Moscarillo | G06F 3/017 345/156 |
| 2013/0328769 A1* | 12/2013 | Jung | G06F 3/017 345/156 |
| 2014/0029789 A1* | 1/2014 | DeLean | G06K 9/20 382/103 |
| 2014/0105455 A1* | 4/2014 | Murase | G06F 3/0426 382/103 |
| 2015/0269783 A1* | 9/2015 | Yun | G02B 27/0172 345/633 |
| 2016/0253044 A1* | 9/2016 | Katz | G06F 3/017 345/156 |
| 2017/0090749 A1* | 3/2017 | Marsden | G06F 3/04886 |
| 2017/0153812 A1* | 6/2017 | Creager | G06F 3/0202 |
| 2017/0262045 A1* | 9/2017 | Rouvinez | G06T 19/006 |
| 2017/0322623 A1* | 11/2017 | McKenzie | G06F 3/013 |
| 2019/0265781 A1* | 8/2019 | Kehoe | G06F 3/0304 |

* cited by examiner

TRANSCRIBING AUGMENTED REALITY KEYBOARD INPUT BASED ON HAND POSES FOR IMPROVED TYPING ACCURACY

BACKGROUND

Field of the Various Embodiments

Various embodiments relate generally to virtual reality and augmented reality, and, more specifically, to transcribing augmented reality keyboard input based on hand poses for improved typing accuracy.

Description of the Related Art

Physical keyboards include numerous keys that users press when typing. When a user of a physical keyboard presses a specific key, that key can be directly transcribed to a corresponding textual character. The keys of a physical keyboard provide kinesthetic feedback according to which the user can become oriented when typing. Based on this kinesthetic feedback, the user may type strings of characters with a high degree of accuracy.

Graphical keyboards displayed on touch screens include graphical keys that users tap when typing. When a user of a graphical keyboard taps a specific graphical key, a touch event generated by the touch screen can be directly transcribed to a corresponding textual character. The keys of the graphical keyboard do not individually provide kinesthetic feedback. Thus, the user cannot become oriented to the keyboard based on the physical sensation of individual keys and must rely only on the sensation of touching the touch screen. Accordingly, the user may not be able to type with a high degree of accuracy. To address this issue, some touch screen devices implement corrective algorithms to improve the transcription of touch events into textual characters.

Virtual keyboards and augmented reality keyboards projected into simulated environments do not include physical keys or physical surfaces of any kind. These types of keyboards therefore cannot provide kinesthetic feedback according to which a user can become oriented when typing. Consequently, typing on a virtual keyboard or augmented reality keyboard can be highly inaccurate. Furthermore, the corrective algorithms mentioned above in conjunction with graphical keyboards are inapplicable to virtual keyboards and augmented reality keyboards because such keyboards do not generate touch events.

As the foregoing illustrates, what is needed in the art is a more effective approach to transcribing input received from virtual keyboards and/or augmented reality keyboards.

SUMMARY

Various embodiments include a computer-implemented method, including: identifying a set of gestures performed relative to an augmented reality keyboard, analyzing the set of gestures to generate a sequence of hand poses, selecting a first transcription model trained on sequences of hand poses that each corresponds to a different text sequence, and transcribing the sequence of hand poses to a first text sequence based on the first transcription model.

At least one advantage of the disclosed techniques is that users of augmented reality keyboards can type accurately without relying on kinesthetic feedback to remain oriented during typing. Accordingly, users of augmented reality keyboards can communicate more effectively compared to conventional, less accurate approaches that do not facilitate effective communication. For these reasons, the disclosed techniques represent a technological advancement compared to prior approaches that transcribe input with low accuracy.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

As noted above, virtual keyboards do not provide any kinesthetic feedback. This lack of feedback prevents a user of a virtual keyboard from becoming oriented to the keyboard, therefore limiting the accuracy with which the user can type. Consequently, virtual keyboard input typically cannot be transcribed into text with high precision.

To address these issues, various embodiments include a transcription engine configured to transcribe augmented reality keyboard input based on a sequence of hand poses performed by a user when typing. A hand pose generator analyzes video of the user typing to generate the sequence of hand poses. The transcription engine implements a set of transcription models to generate a series of keystrokes based on the sequence of hand poses. Each keystroke in the series may correspond to one or more hand poses in the sequence of hand poses. The transcription engine is also configured to monitor the behavior of the user and select between transcription models depending on the behavior, for example based on the attention level of the user. The transcription engine may select a first transcription model when the user types in a focused manner and then select a second transcription model when the user types in a less focused, conversational manner.

At least one advantage of the techniques described herein is that users of augmented reality keyboards can type accurately without relying on kinesthetic feedback to remain oriented during typing. Accordingly, the disclosed techniques represent a technological advancement compared to prior approaches that transcribe input with low accuracy.

System Overview

Figure 1:
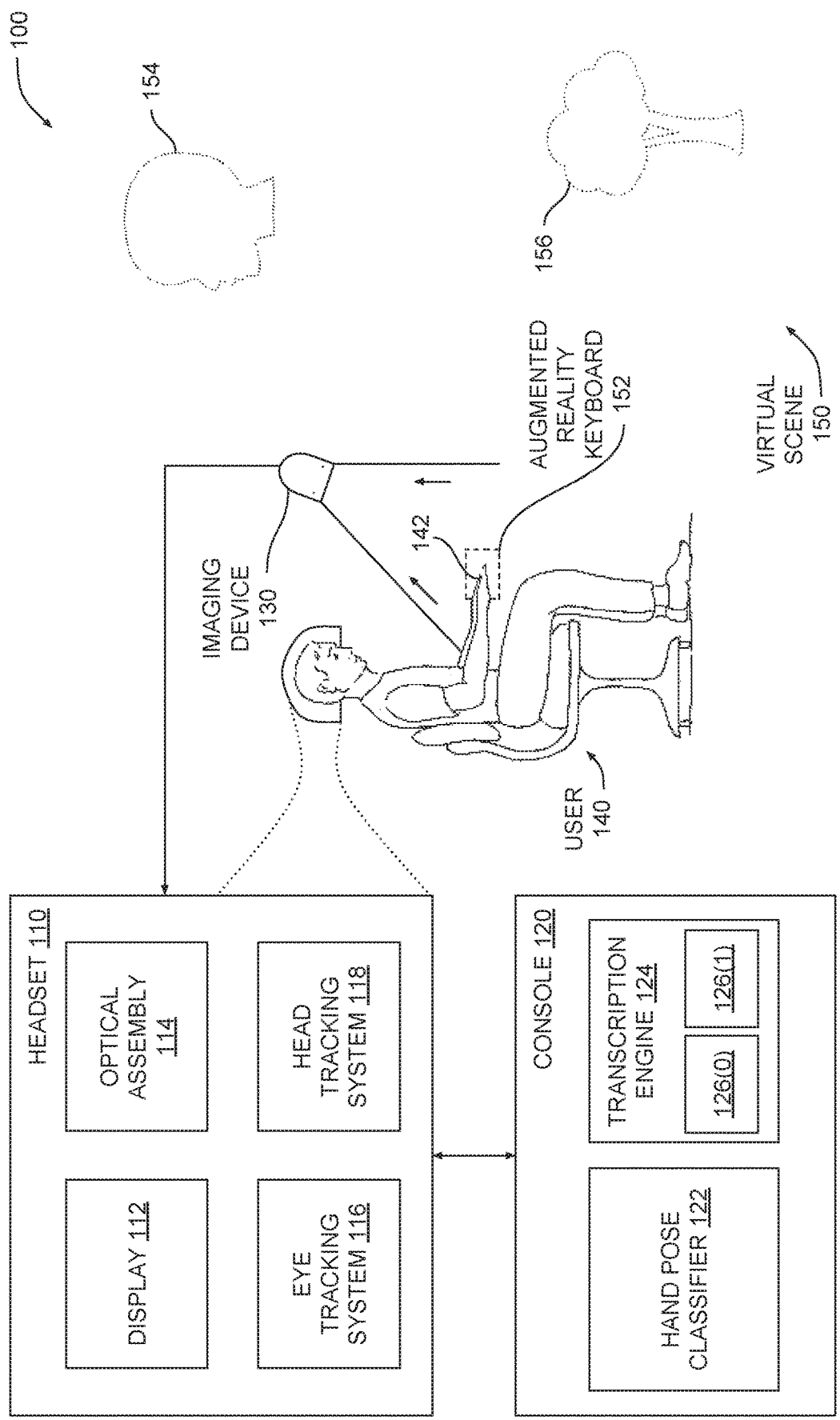
FIG. 1 illustrates a system configured to implement one or more aspects of the various embodiments.

FIG. 1 illustrates a system configured to implement one or more aspects of the various embodiments. As shown, a system 100 includes a headset 110, a console 120, and an imaging device 130, coupled together.

Headset 110 is a wearable device configured to be worn by a user 140. In one embodiment, headset 110 is worn on the head of user 140. Headset 110 includes a display 112, an optical assembly 114, an eye tracking system 116, and a head tracking system 118. Headset 110 may also include an imaging device 130, in some embodiments. Headset 110 is configured to immerse user 140 into a virtual reality (VR) and/or augmented reality (AR) environment that includes a virtual scene 150. In doing so, headset 110 causes display 112 to emit light to user 140 representing virtual scene 150. Optical assembly 114 may perform various optical adjustments with the emitted light. Elements included in the virtual scene and displayed to user 140 in this manner may be described in this disclosure as being "virtual."

Virtual scene 150 includes an augmented reality keyboard 152 and other virtual elements, such as virtual elements 154 and 156. Augmented reality keyboard 152 could be any virtual device, including a virtual keyboard, a virtual tablet, or another virtualized representation of a physical input device, for example and without limitation. User 140 interacts with augmented reality keyboard 152 by performing typing motions using hands 142. These typing motions generally correspond to keystrokes user 140 performs to express a text sequence. Imaging device 130 captures video data depicting these typing motions and transmits the video data to console 120.

Console 120 is a computing device configured to manage the operation of headset 110. Console 120 may generate and render virtual scene 150 on behalf of headset 110. Console 120 includes a hand pose classifier 122 and a transcription engine 124. Hand pose classifier 122 includes a neural network that is trained to process images of human hands and classify those images as corresponding to particular hand poses. Hand pose classifier 122 analyzes the video data captured by imaging device 130 and then generates a sequence of hand poses representing the configuration of hands 142 of user 140 during typing.

Transcription engine 124 implements a set of transcription models 126 to transcribe the sequence of hand poses into a sequence of keystroke events. Those keystroke events may correspond to the text sequence that user 140 intends to express via the typing motions or other gestures user 140 may perform. Each transcription model 126 includes a neural network configured to classify different subsequences of hand poses as corresponding to specific keystroke events. A given transcription model 126 may include a recurrent neural network, a sequential neural network, or any other form of neural network configured to process inputs that occur within a sliding time window. Transcription engine 124 is configured to select between transcription models 126 according to the behavior of user 140.

In particular, when user 140 is highly attentive to typing on augmented reality keyboard 152, transcription engine 124 may implement transcription model 126(0) to transcribe hand poses into keystrokes, and, ultimately, text. Alternatively, when user 140 is less attentive to typing on augmented reality keyboard 152, transcription engine 124 may implement transcription model 126(1) to transcribe hand poses into keystrokes and corresponding text. In one embodiment, transcription engine 124 may combine transcription models 126(0) and 126(1) based on a determined attention level associated with user 140 in order to perform transcriptions. Transcription models 126(0) and 126(1) are trained using different training procedures that are described in greater detail below in conjunction with FIGS. 3-4 and 5-6, respectively.

Transcription engine 124 may determine the degree to which user 140 attends to typing on augmented reality keyboard 152 based on a variety of criteria. For example, and without limitation, transcription engine 124 could determine, via eye tracking system 116, that user 140 is visually focused on augmented reality keyboard 152. Transcription engine 124 could also determine, via head tracking system 118, that user 140 is facing downwards toward augmented reality keyboard 152. Transcription engine 124 may analyze other behaviors associated with user 140 as well, including the speed with which user 140 types, among others.

According to the technique described above, transcription engine 124 is configured to transcribe input provided by user 140 relative to augmented reality keyboard 152 into a sequence of keystrokes. Those keystrokes may correspond to characters typically found on a conventional keyboard. Accordingly, user 140 may interact with augmented reality keyboard 152 in a similar manner to interacting with a physical keyboard or a graphical keyboard. Because transcription engine 124 implements context-specific transcription models 126 based on user behavior, transcription engine 124 may determine the specific characters user 140 intends to type with greater accuracy compared to conventional approaches.

Figure 2:
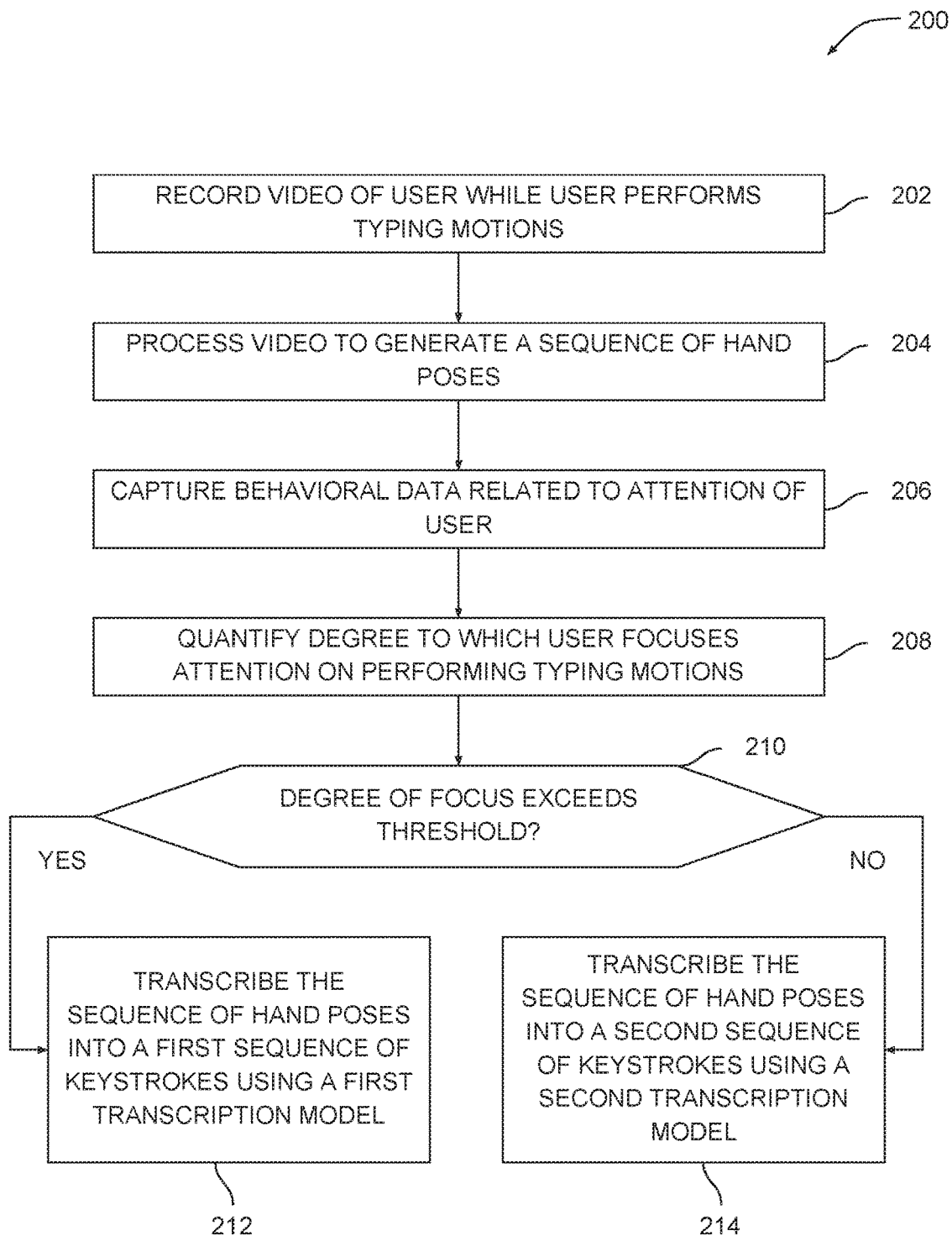
FIG. 2 is a flow diagram of method steps for transcribing augmented reality keyboard input, according to various embodiments.

FIG. 2 is a flow diagram of method steps for transcribing augmented reality keyboard input, according to various embodiments. Although the method steps are described in conjunction with the system of FIG. 1, persons skilled in the art will understand that any system may be configured to perform the method steps in any order.

As shown, a method 200 begins at step 202, where imaging device 130 records video of user 140 while user 140 performs typing motions and/or other gestures with augmented reality keyboard 152. Augmented reality keyboard 152 is a virtualized representation of a physical input device, such as a keyboard or a mobile device, among others. User 140 may perform the typing motions on a static surface such as a table. Alternatively, user 140 may perform the typing motions dynamically while moving, without the need for a static surface. Persons skilled in the art will understand that typing motions represent just one example of a gesture user 140 may perform in order to express language, and that other gestures may also be transcribed into text. At step 204, hand pose classifier 122 processes the video captured by imaging device 130 to generate a sequence of hand poses. Each hand pose in the sequence represents the position and configuration of hands 142 of user 140 when performing the typing motions. A given hand pose may also be associated with a timestamp.

At step 206, headset 110 captures behavioral data related to the attention of user 140. The behavioral data could indicate, for example and without limitation, a gaze direction or point of focus associated with the eyes of user 140, a head orientation associated with the head of user 140, a speed with which user 140 performs typing motions, a facial expression of user 140, or an activity performed by user 140 within virtual scene 150, among other identifiable behaviors.

At step 208, transcription engine 124 quantifies the degree to which user 140 focuses attention on performing the typing motions. For example, and without limitation, transcription engine 124 could compute a distance between a point of focus associated with the eyes of user 140 and the position of augmented reality keyboard 152 within virtual scene 150. A lower distance could indicate a higher degree of focus on performing the typing motions. In another example, transcription engine 124 could compute a speed with which user 140 performs the typing motions. A lower speed may indicate a higher degree of focus on performing the typing motions.

At step 210, transcription engine 124 determines whether the degree of focus exceeds a threshold. Returning to the first example mentioned above, transcription engine 124 could determine that the distance between the point of focus and the position of augmented reality keyboard 152 is less than a threshold. Returning to the second example mentioned above, transcription engine 124 could determine that the computed typing speed is less than the average speed with which user 140 types. If transcription engine 124 determines that the degree of focus exceeds the threshold, then the method proceeds to step 212. At step 212, transcription engine 124 transcribes the sequence of hand poses into a first sequence of keystrokes using transcription model 126(0). Otherwise, if transcription engine 124 determines that the degree of focus does not exceed the threshold, then the method proceeds to step 214. At step 214, transcription engine 124 transcribes the sequence of hand poses into a second sequence of keystrokes using transcription model 126(1). The method 200 may then return to step 200 and repeat in the manner described above.

As mentioned above in conjunction with FIG. 1, transcription models 126 may be trained according to different training procedures. Those training procedures are described in greater detail below in conjunction with FIGS. 3-6.

Transcription Model Training

Figure 3:
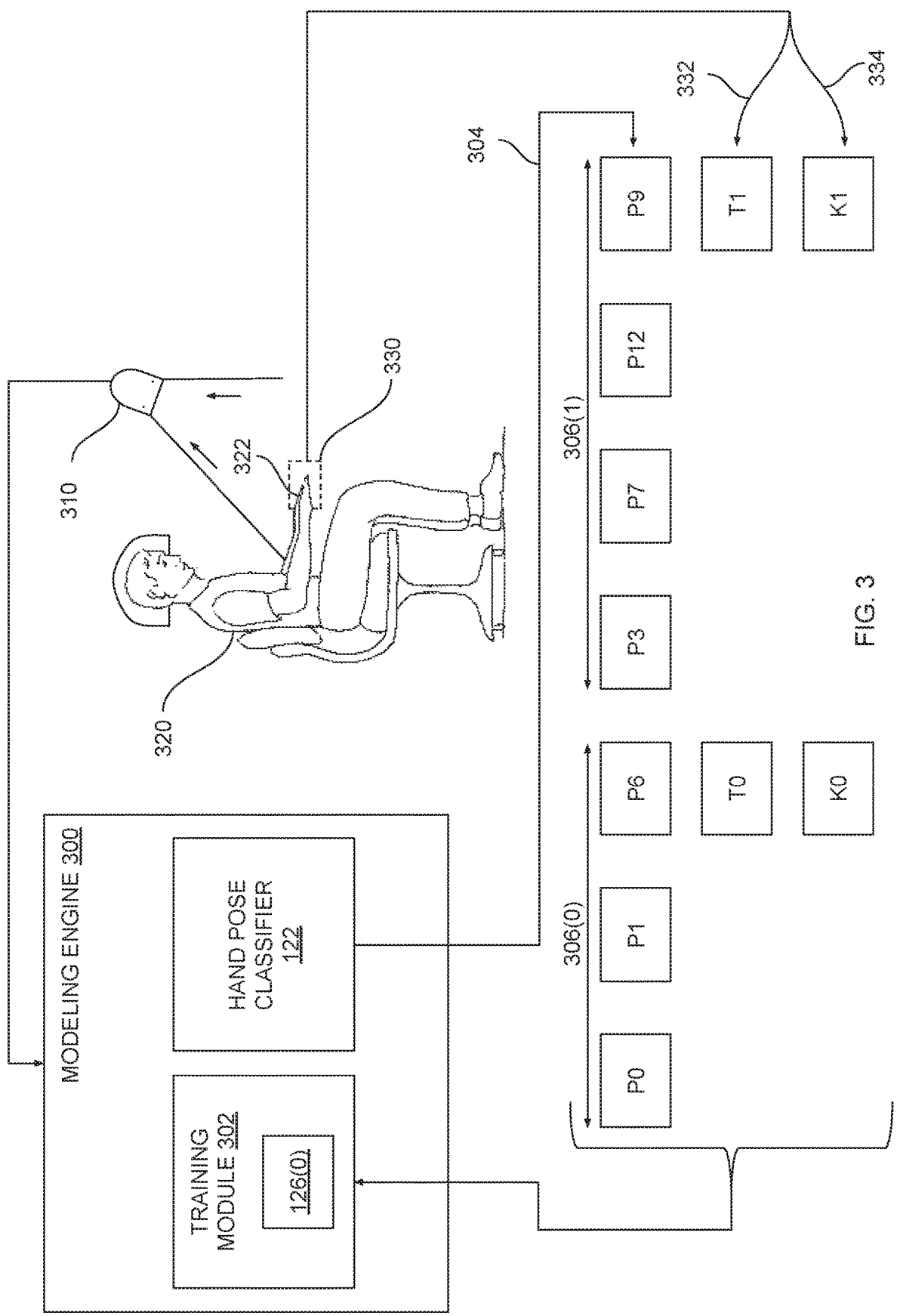
FIG. 3 illustrates how the first transcription model of FIG. 1 is trained, according to various embodiments.

FIG. 3 illustrates how the first transcription model of FIG. 1 is trained, according to various embodiments. As shown, a modeling engine 300 is coupled to an imaging device 310. Imaging device 310 is configured to record video associated with a test user 320 when test user 320 types on a touch screen device 330. Touch screen device 330 displays a graphical keyboard to test user 320. Imaging device 310 may specifically record video associated with hands 322 of user 320 when user 320 types on the graphical keyboard.

Hand pose classifier 122 processes the recorded video data to generate a sequence 304 of hand poses. Sequence 304 includes exemplary hand poses P0, P1, P6, P3, P7, P12, and P9. In parallel, touch screen device 330 outputs a sequence 332 of touch events and a sequence 334 of keystroke events. Sequence 332 includes exemplary touch events T0 and T1. Each touch event may indicate that test user 320 touched touch screen device 330 at a particular time. Sequence 334 includes exemplary keystroke events K0 and K1. Each keystroke event may indicate that test user 320 tapped a specific key on the graphical keyboard displayed by touch screen device 330 at a particular time. Sequences 304, 332, and 334 may be temporally aligned, at least to some extent.

Modeling engine 300 includes a training module 302 configured to consume sequences 304, 332, and 334. Based on these sequences, training module 302 trains transcription model 126(0). During training, training module 302 may adjust a set of weight values associated with transcription model 126(0) in order to cause transcription model 126(0) to map subsequences 306 of hand poses to specific touch events and/or to specific keystroke events. For example, training module 302 may train transcription model 126(0) to map subsequence 306(0) to touch event T0 and/or to keystroke event K0. Similarly, training module 302 may train transcription model 126 to map subsequence 306(1) to touch event T1 and/or to keystroke event K1. Training module 302 may implement a gradient descent approach to training transcription model 126(0), among other approaches to training neural networks.

Via the training procedure described above, training module 302 trains transcription model 126(0) based on training data gathered when test user 320 is presented with a graphical keyboard. This particular training setup maybe analogous to a situation where a user focuses attention on typing. Accordingly, transcription model 126(0) is generally used to perform input transcriptions when a user displays behavior that suggests an elevated attention on typing.

Figure 4:
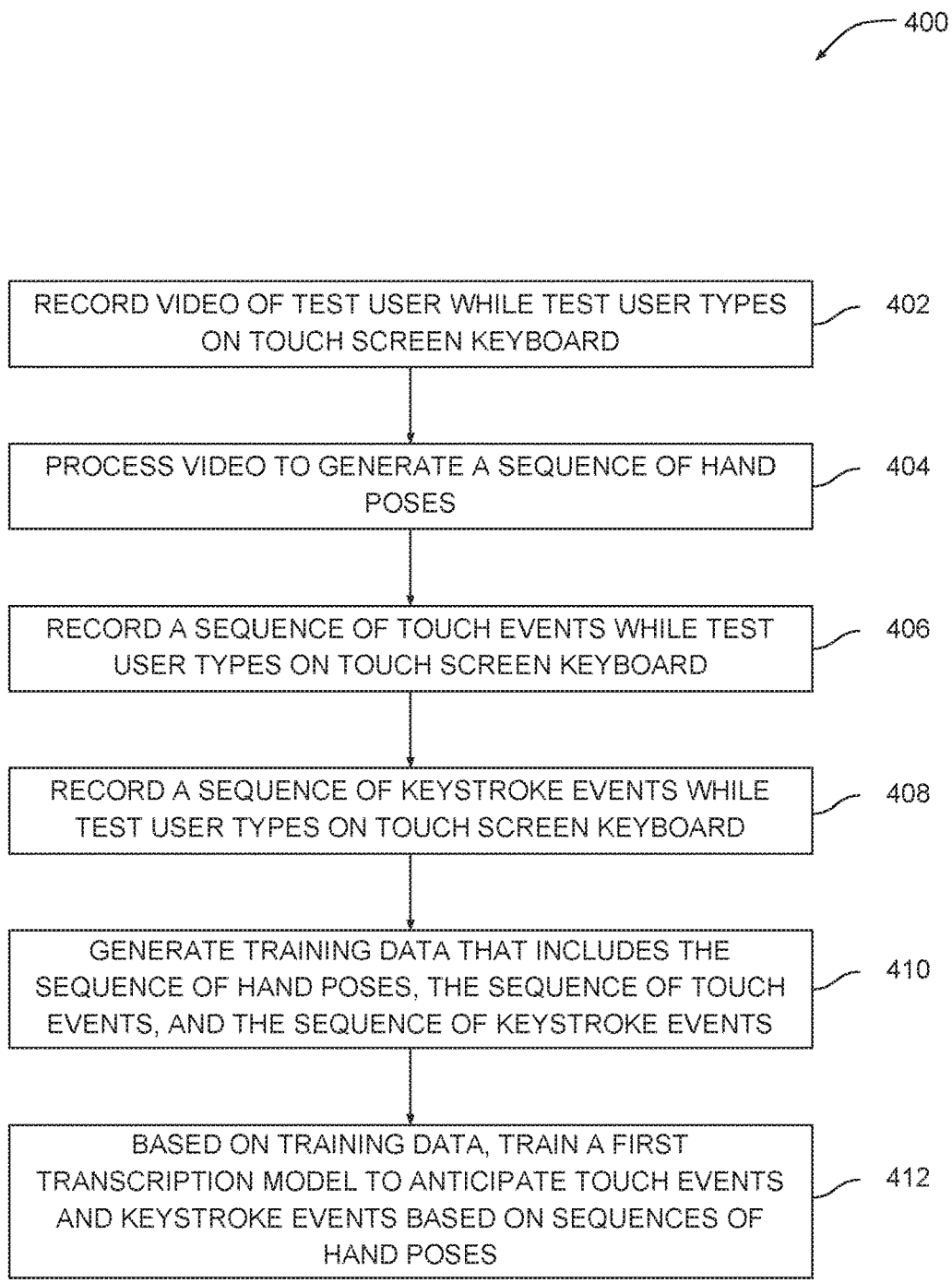
FIG. 4 is a flow diagram of method steps for training a transcription model based on keystroke events, according to various embodiments.

FIG. 4 is a flow diagram of method steps for training a transcription model based on keystroke events, according to various embodiments. Although the method steps are described in conjunction with the systems of FIGS. 1-3, persons skilled in the art will understand that any system may be configured to perform the method steps in any order.

As shown, the method 400 begins at step 402, where imaging device 310 records video of test user 320 while test user 320 types on touch screen device 330. Touch screen device 330 displays a graphical keyboard to test user 320. The recorded video depicts hands 322 of test user 320 during typing. At step 404, hand pose classifier 122 processes the video to generate a sequence 304 of hand poses. Hand pose classifier 122 may implement a neural network trained to classify images of human hands as occupying specific hand poses.

At step 406, touch screen device 330 records a sequence 332 of touch events while test user 320 types on the graphical keyboard displayed by touch screen device 330. A given touch event in sequence 332 indicates that the surface of touch screen 330 was touched at a particular time. At step 408, touch screen device 330 records a sequence of keystroke events while test user 320 types on the graphical keyboard displayed by touch screen 330. A given keystroke event in sequence 334 indicates that a particular key of the graphical keyboard was touched at a particular time.

At step 410, training module 302 generates training data that includes sequence 304 of hand poses, sequence 332 of touch events, and sequence 334 of keystroke events. In doing so, training module 302 may tag sequence 304 as input data and tag sequences 332 and 334 as target data that should be predicted based on sequence 304. At step 412, training module 302 trains transcription model 126(0) to anticipate touch events and keystroke events based on sequences of hand poses using the training data generated at step 410. Training module 302 may train transcription model 126(0) until transcription model 126 is capable of reliably predicting both touch events and keystroke events based on subsequences of hand poses.

Via the approach described above, training module 302 trains transcription model 126(0) to transcribe augmented reality keyboard input into keystrokes corresponding to text. Training module 302 may train transcription model 126(1) using an alternative training procedure, as described in greater detail below in conjunction with FIGS. 5-6.

Figure 5:
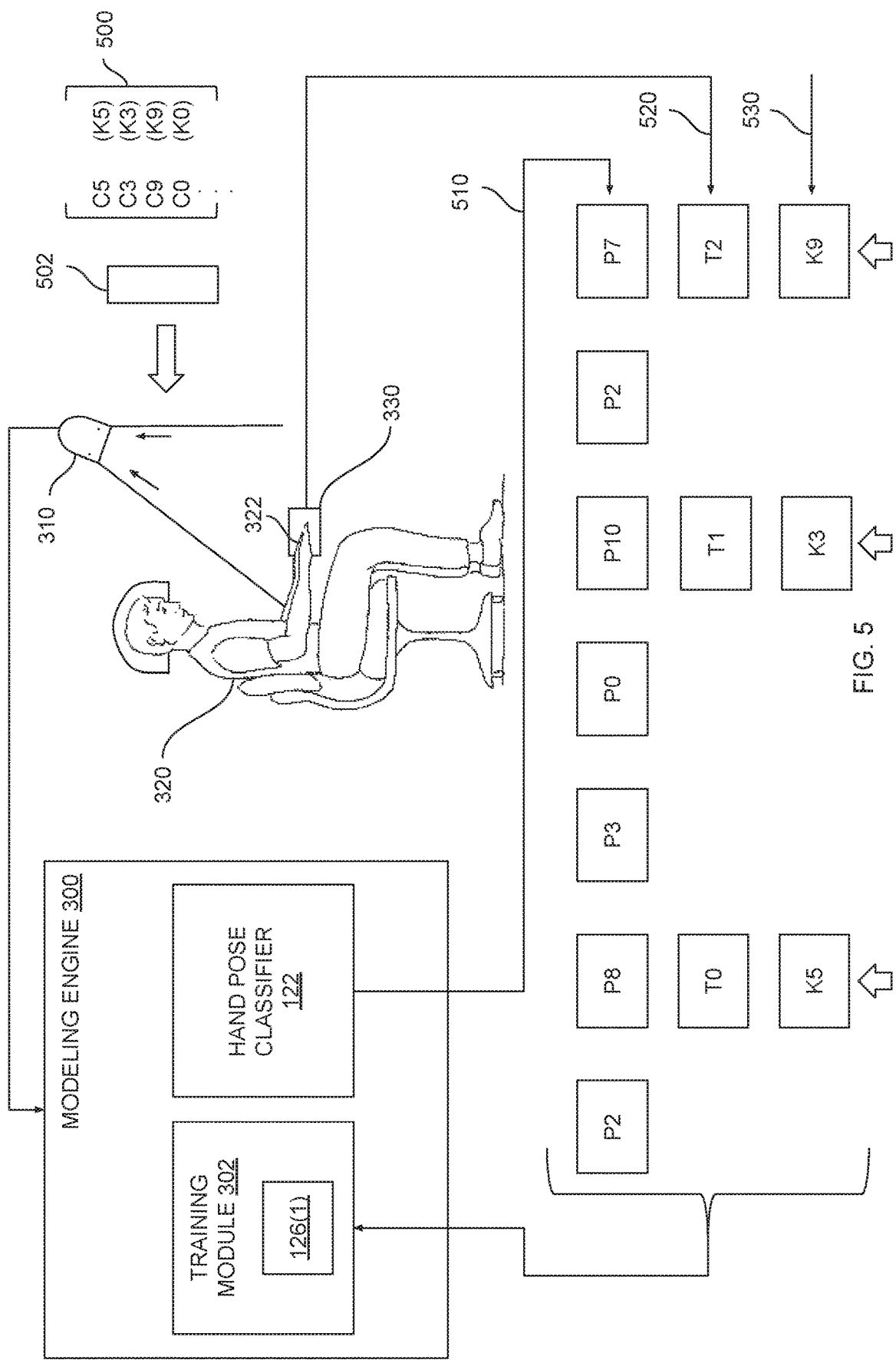
FIG. 5 illustrates how the second transcription model of FIG. 1 is trained, according to various embodiments.

FIG. 5 illustrates how the second transcription model of FIG. 1 is trained, according to various embodiments. As shown, imaging device 310 records video associated with test user 320 while test user 320 types on touch screen device 330, similar to the training procedure described above in conjunction with FIGS. 4-5. Touch screen device 330 does not, however, display a graphical keyboard to test user 320.

With the training procedure shown, training module 302 outputs a test sequence 500 of characters to test user 320. Each character generally corresponds to one or more keystrokes. Test sequence 500 includes exemplary characters C5, C3, C9, and C0, corresponding to keystrokes K5, K3, K9, and K0, respectively. Training module 302 outputs test sequence 500 to test user 320. For example, and without limitation, training module 302 could cause a display 502 to display test sequence 500 graphically, among other possibilities. Test user 320 is instructed to type test sequence 500 using touch screen device 330. In response to test sequence 500, test user 320 attempts to perform keystrokes corresponding to the characters included in test sequence 500. Lacking a physical keyboard or a graphical keyboard, test user 320 may perform these keystrokes based on muscle memory and/or based on the sensation of tapping touch screen device 330. While test user 320 types in this manner, imaging device 310 records video of test user 320 and transmits this video to hand pose classifier 122.

Hand pose classifier 122 processes the recorded video data to generate a sequence 510 of hand poses. Sequence 510 includes exemplary hand poses P2, P8, P3, P0, P10, P2, and P7. In parallel, touch screen device 330 outputs a sequence 520 of touch events, including exemplary touch events T0, T1, and T2, based on the keystrokes performed by test user 320. Touch screen device 330 does not, however, output keystroke events as with the previous training procedure.

Instead, training module 302 parses sequence 520 of touch events sequentially and, for each touch event, maps the touch event to a same-indexed character included in test input 500. For example, and without limitation, training module 302 could map the zeroth touch event in sequence 520 to the zeroth character in test sequence 500, the first touch event in sequence 520 to the first character in test sequence 500, and so forth. Then, for each character mapped in this fashion, training module 302 includes a corresponding keystroke event into sequence 530 of keystroke events. In doing so, training module 302 may tag the keystroke with a time stamp associated with the corresponding touch event to generate a keystroke event. For example, training module 302 could map touch event T0 to character C5, and then include keystroke K5 into sequence 530 as a keystroke event. Training module 302 may include keystroke events in sequence 530 temporally aligned, at least to some degree, with corresponding touch events included in sequence 520.

Based on these sequences, training module 302 trains transcription model 126(1). During training, training module 302 may adjust a set of weight values associated with transcription model 126(1) in order to cause transcription model 126(1) to map subsequences of hand poses to specific touch events and/or to specific keystroke events. Training module 302 generally implements a similar training procedure to train transcription model 126(0) as that described above in conjunction with transcription model 126(1).

By training transcription model 126(1) using the training procedure discussed above, training module 302 transcription model 126(1) to transcribe user input when the user cannot see a keyboard and is provided with little to no kinesthetic feedback. This particular training setup may be analogous to a situation where a user types conversationally and does not focus an elevated level of attention on performing accurate keystrokes. Thus, transcription model 126(1) can be used to perform input transcriptions when users display behavior associated with casual and less focused typing.

Figure 6:
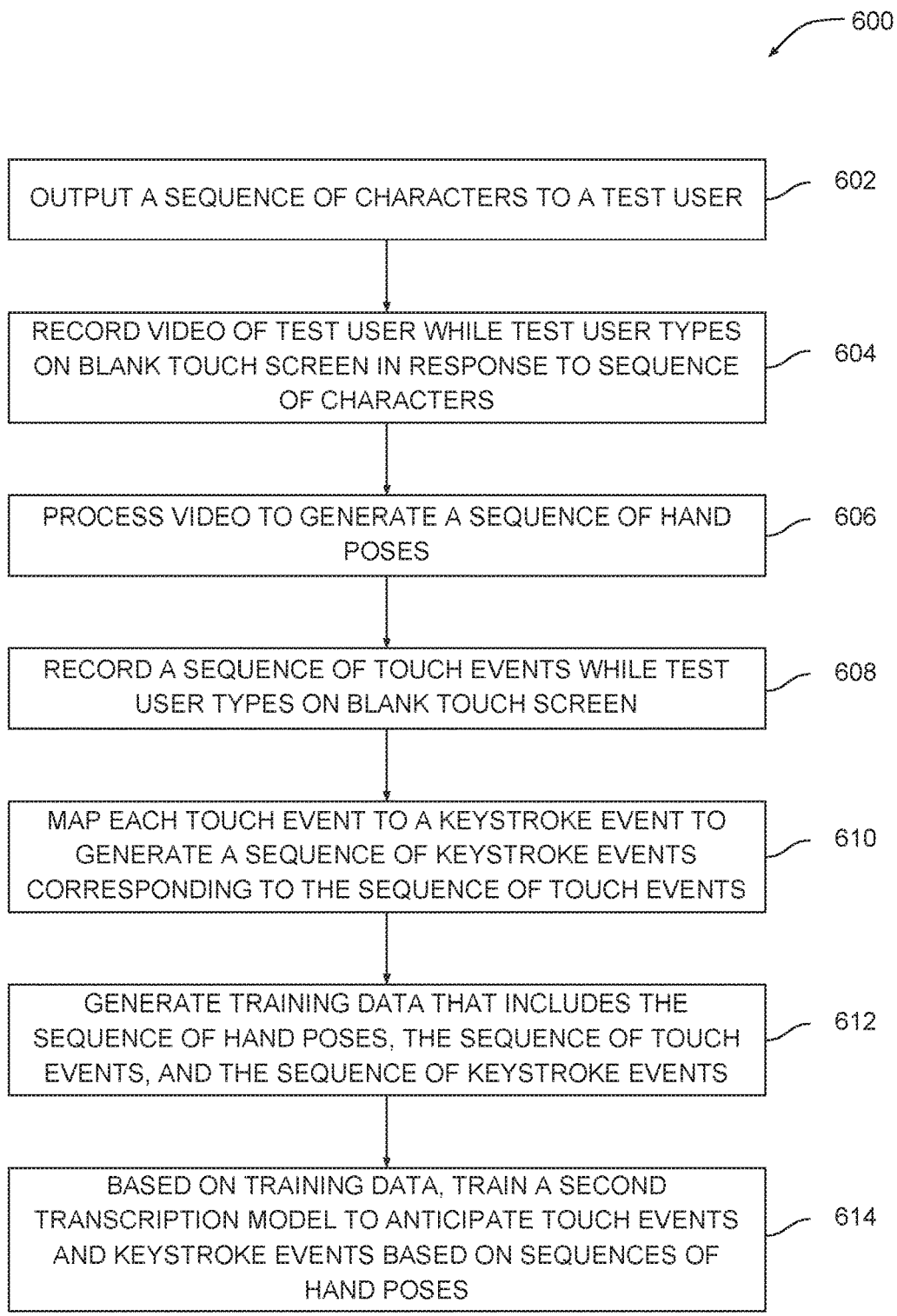
FIG. 6 is a flow diagram of method steps for training a transcription model based on touch events, according to various embodiments.

FIG. 6 is a flow diagram of method steps for training a transcription model based on touch events, according to various embodiments. Although the method steps are described in conjunction with the systems of FIGS. 1-5, persons skilled in the art will understand that any system may be configured to perform the method steps in any order.

As shown, a method 600 begins at step 602, where training module 302 causes a test sequence 500 to be output to test user 320. Training module 302 could, for example and without limitation, play audio that represents test sequence 500. Test user 320 is instructed to type characters corresponding to test sequence 500 using touch screen device 330.

At step 604, imaging device 310 records video of test user 320 while test user 320 types using touch screen device 330. Touch screen device 330 does not display a graphical keyboard and need not record specific keystrokes. At step 606, hand pose classifier 122 processes the recorded video to generate a sequence 510 of hand poses. At step 608, touch screen device 330 records a sequence 520 of touch events while test user 320 types using touch screen device 330. A given touch event in sequence 520 indicates that the surface of touch screen 330 was touched at a particular time.

At step 610, training module 302 maps each touch event in sequence 520 to a keystroke event to generate a sequence 530 of keystroke events that are aligned, at least partially, to sequence 520. Training module 502 may map a given touch event included in sequence 520 to a particular keystroke by identifying a character included in test input 500 having the same index as the given touch event and then determining the keystroke corresponding to that character. Training module 502 then generates a corresponding keystroke event to be included in sequence 530.

At step 612, training module 302 generates training data that includes sequence 510 of hand poses, sequence 520 of touch events, and sequence 530 of keystroke events. Training module 302 may tag sequence 510 as input data and tag sequences 520 and 530 as target data that should be predicted based on sequence 510. At step 614, training module 302 trains transcription model 126(1) to predict touch events and keystroke events based on sequences of hand poses using the training data generated at step 612. Training module 302 may train transcription model 126(1) iteratively until some convergence criterion is met.

Referring generally to FIGS. 1-6, person skilled in the art will understand that any technically feasible form of computer hardware and/or or software may be configured to perform any of the techniques discussed thus far. An exemplary computing device is described in greater detail below in conjunction with FIG. 7.

Figure 7:
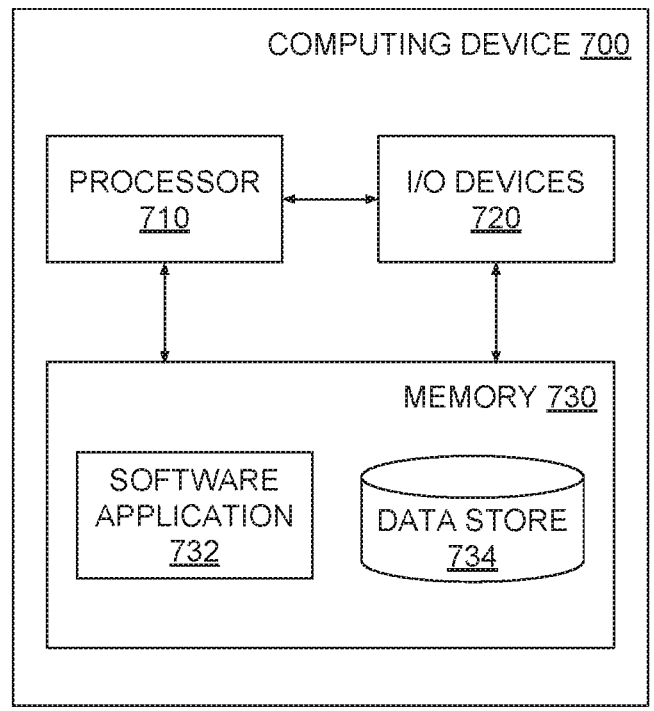
FIG. 7 illustrates a computing device included in the system of FIG. 1, according to various embodiments.

FIG. 7 illustrates a computing device included in the system of FIG. 1, according to various embodiments. As shown, computing device 700 includes a processor 710, input/output (I/O) devices 720, and memory 730. Memory 730 includes a software application 732 and a data store 734. Processor 710 may include any hardware configured to process data and execute software applications. I/O devices 720 include devices configured to receive input, devices configured to provide output, and devices configured to both receive input and provide output. Memory 730 may be implemented by any technically feasible storage medium. Software application 732 includes program code that, when executed by processor 710, performs any of the functionality described herein. Software application 732 may access data stored in data store 734. Those skilled in the art will understand that computing device 700 is provided for exemplary purposes only and not meant to limit the scope of the present embodiments.

In sum, a transcription engine transcribes augmented reality keyboard input based on a sequence of hand poses performed by a user when typing. A hand pose generator analyzes video of the user typing to generate the sequence of hand poses. The transcription engine implements a set of transcription models to generate a series of keystrokes based on the sequence of hand poses. Each keystroke in the series may correspond to one or more hand poses in the sequence of hand poses. The transcription engine monitors the behavior of the user and selects between transcription models depending on the attention level of the user. The transcription engine may select a first transcription model when the user types in a focused manner and then select a second transcription model when the user types in a less focused, conversational manner.

At least one advantage of the techniques described herein is that users of augmented reality keyboards can type accurately without relying on kinesthetic feedback to remain oriented during typing. Accordingly, users of augmented reality keyboards can communicate more effectively compared to conventional, less accurate approaches that do not facilitate effective communication. For these reasons, the disclosed techniques represent a technological advancement compared to prior approaches that transcribe input with low accuracy.

Any and all combinations of any of the claim elements recited in any of the claims and/or any elements described in this application, in any fashion, fall within the contemplated scope of the present embodiments and protection.

1. A computer-implemented method, comprising: identifying a set of gestures performed relative to an augmented reality keyboard; analyzing the set of gestures to generate a sequence of hand poses; selecting a first transcription model trained on sequences of hand poses that each corresponds to a different text sequence; and transcribing the sequence of hand poses to a first text sequence based on the first transcription model.

2. The computer-implemented method of clause 1, further comprising generating first data that includes video depicting the set of gestures.

3. The computer-implemented method of any of clauses 1 and 2, wherein the augmented reality keyboard is included in a virtual environment.

4. The computer-implemented method of any of clauses 1, 2, and 3, further comprising training the first transcription model based on first training data that is generated based on a first set of gestures performed when a user types on a surface that displays a graphical keyboard.

5. The computer-implemented method of any of clauses 1, 2, 3, and 4, further comprising generating the first training data by capturing a sequence of touch events corresponding to a sequence of keypress events associated with the graphical keyboard.

6. The computer-implemented method of any of clauses 1, 2, 3, 4, and 5, further comprising training the first transcription model based on first training data that is generated based on a first set of gestures performed when a user types on a surface that does not display a graphical keyboard.

7. The computer-implemented method of any of clauses 1, 2, 3, 4, 5, and 6, further comprising generating first training data by capturing a sequence of touch events when the user types on the surface and generating a sequence of keypress events based on the sequence of touch events and a test sequence.

8. The computer-implemented method of any of clauses 1, 2, 3, 4, 5, 6, and 7, further comprising generating a first keypress event included in the sequence of keypress events, the first keypress event corresponding to a first touch event included in the sequence of touch events and a first character included in the test sequence.

9. The computer-implemented method of any of clauses 1, 2, 3, 4, 5, 6, 7, and 8, further comprising: determining a degree of attention with which the set of gestures is performed; and selecting the first transcription model from a plurality of transcription models based on the degree of attention.

10. The computer-implemented method of any of clauses 1, 2, 3, 4, 5, 6, 7, 8, and 9, further comprising generating first data indicating a direction a user faces when performing the set of gestures, wherein determining the degree of attention comprises comparing the direction the user faces to a direction where the augmented reality keyboard resides.

11. The computer-implemented method of any of clauses 1, 2, 3, 4, 5, 6, 7, 8, 9, and 10, further comprising generating first data indicating a gaze direction of a user when performing the set of gestures, wherein determining the degree of attention comprises comparing the gaze direction of the user to a direction where the augmented reality keyboard resides.

12. The computer-implemented method of any of clauses 1, 2, 3, 4, 5, 6, 7, 8, 9, 10, and 11, further comprising generating first data indicating a typing speed associated with the performing of the set of gestures, wherein determining the degree of attention comprises comparing the typing speed of the user to an average typing speed.

13. The computer-implemented method of any of clauses 1, 2, 3, 4, 5, 6, 7, 8, 9, 10, 11, and 12, wherein selecting the first transcription model comprises determining that the degree of attention exceeds a threshold, thereby indicating that a user is attentive to performing the set of gestures.

14. The computer-implemented method of any of clauses 1, 2, 3, 4, 5, 6, 7, 8, 9, 10, 11, 12, and 13, wherein the first transcription model is trained according to a first training procedure, and further comprising: generating a second sequence of hand poses corresponding to a second set of gestures performed relative to the augmented reality keyboard; determining a level of attention with which the second set of gestures are performed; and in response to the determined level of attention, transcribing the second sequence of hand poses to a second text sequence using a second transcription model, wherein the second transcription model is trained according to a second training procedure.

15. The computer-implemented method of any of clauses 1, 2, 3, 4, 5, 6, 7, 8, 9, 10, 11, 12, 13, and 14, wherein the level of attention is increased from a prior level of attention with which the first set of gestures are performed.

16. A computer system, comprising: a memory storing instructions; and a processor that executes the instructions to: identify a set of gestures performed relative to an augmented reality keyboard, analyze the set of gestures to generate a sequence of hand poses, select a first transcription model trained on sequences of hand poses that each corresponds to a different text sequence, and transcribe the sequence of hand poses to a first text sequence based on the first transcription model.

17. The computer system of clause 16, wherein the processor executes the instructions to: determine a degree of attention with which the set of gestures is performed; and select the first transcription model from a plurality of transcription models based on the degree of attention.

18. The computer system of any of clauses 16 and 17, wherein the processor executes the instructions to: generate a second sequence of hand poses corresponding to a second set of gestures performed relative to the augmented reality keyboard; determine a level of attention with which the second set of gestures are performed; and in response to the determined level of attention, transcribe the second sequence of hand poses to a second text sequence using a second transcription model, wherein the second transcription model is trained according to a second training procedure.

19. A non-transitory computer-readable medium storing instructions that, when executed by a processor, cause the processor to: identify a set of gestures performed relative to an augmented reality keyboard; analyze the set of gestures to generate a sequence of hand poses; select a first transcription model trained on sequences of hand poses that each corresponds to a different text sequence; and transcribe the sequence of hand poses to a first text sequence based on the first transcription model.

20. The non-transitory computer-readable medium of clause 19, wherein the instructions further cause the processor to: determine a degree of attention with which the set of gestures is performed; and select the first transcription model from a plurality of transcription models based on the degree of attention.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   identifying a set of gestures performed relative to an augmented reality keyboard;
   analyzing the set of gestures to generate a sequence of hand poses;
   determining a degree of attention with which the set of gestures is performed;
   selecting, based on the degree of attention, a first transcription model from a plurality of transcription models, wherein each transcription model included in the plurality of transcription models is associated with a respective degree of attention and trained on sequences of hand poses that correspond to different text sequences and are associated with the respective degree of attention; and
   transcribing the sequence of hand poses to a first text sequence using the first transcription model.

2. The computer-implemented method of claim 1, further comprising generating first data that includes video depicting the set of gestures.

3. The computer-implemented method of claim 1, wherein the augmented reality keyboard is included in a virtual environment.

4. The computer-implemented method of claim 1, wherein the first transcription model is trained based on first training data that is generated based on a first set of gestures performed when a user types on a surface that displays a graphical keyboard.

5. The computer-implemented method of claim 4, wherein the first training data is generated by capturing a sequence of touch events corresponding to a sequence of keypress events associated with the graphical keyboard.

6. The computer-implemented method of claim 1, wherein the first transcription model is trained based on first training data that is generated based on a first set of gestures performed when a user types on a surface that does not display a graphical keyboard.

7. The computer-implemented method of claim 6, further comprising generating the first training data by capturing a sequence of touch events when the user types on the surface and generating a sequence of keypress events based on the sequence of touch events and a test sequence.

8. The computer-implemented method of claim 7, further comprising generating a first keypress event included in the sequence of keypress events, the first keypress event corresponding to a first touch event included in the sequence of touch events and a first character included in the test sequence.

9. The computer-implemented method of claim 1, further comprising generating first data indicating a direction a user faces when performing the set of gestures, wherein determining the degree of attention comprises comparing the direction the user faces to a direction where the augmented reality keyboard resides.

10. The computer-implemented method of claim 1, further comprising generating first data indicating a gaze direction of a user when performing the set of gestures, wherein determining the degree of attention comprises comparing the gaze direction of the user to a direction where the augmented reality keyboard resides.

11. The computer-implemented method of claim 1, further comprising generating first data indicating a typing speed associated with the performing of the set of gestures, wherein determining the degree of attention comprises comparing the typing speed of the user to an average typing speed.

12. The computer-implemented method of claim 1, wherein selecting the first transcription model comprises determining that the degree of attention exceeds a threshold, thereby indicating that a user is attentive to performing the set of gestures.

13. The computer-implemented method of claim 1, wherein the first transcription model is trained according to a first training procedure, and further comprising:
generating a second sequence of hand poses corresponding to a second set of gestures performed relative to the augmented reality keyboard;
determining a degree of attention with which the second set of gestures are performed; and
in response to the determined degree of attention with which the second set of gestures are performed, transcribing the second sequence of hand poses to a second text sequence using a second transcription model, wherein the second transcription model is trained according to a second training procedure.

14. The computer-implemented method of claim 13, wherein the degree of attention with which the second set of gestures are performed is increased from a prior degree of attention with which a prior set of gestures are performed.

15. A computer system, comprising:
a memory storing instructions; and
a processor that executes the instructions to:
identify a set of gestures performed relative to an augmented reality keyboard,
analyze the set of gestures to generate a sequence of hand poses,
determine a degree of attention with which the set of gestures is performed,
select, based on the degree of attention, a first transcription model from a plurality of transcription models, wherein each transcription model included in the plurality of transcription models is associated with a respective degree of attention and trained on sequences of hand poses that correspond to different text sequences and are associated with the respective degree of attention, and
transcribe the sequence of hand poses to a first text sequence using on the first transcription model.

16. The computer system of claim 15, wherein the processor further executes the instructions to:
generate a second sequence of hand poses corresponding to a second set of gestures performed relative to the augmented reality keyboard;
determine a degree of attention with which the second set of gestures are performed; and
in response to the determined degree of attention with which the second set of gestures are performed, transcribe the second sequence of hand poses to a second text sequence using a second transcription model, wherein the second transcription model is trained according to a different training procedure than the first transcription model is trained.

17. A non-transitory computer-readable medium storing instructions that, when executed by a processor, cause the processor to:
identify a set of gestures performed relative to an augmented reality keyboard;
analyze the set of gestures to generate a sequence of hand poses;
determine a degree of attention with which the set of gestures is performed;
select, based on the degree of attention, a first transcription model from a plurality of transcription models, wherein each transcription model included in the plurality of transcription models is associated with a respective degree of attention and trained on sequences of hand poses that correspond to different text sequences and are associated with the respective degree of attention; and
transcribe the sequence of hand poses to a first text sequence using the first transcription model.

* * * * *